(12) United States Patent
Kamata

(10) Patent No.: US 9,325,205 B2
(45) Date of Patent: Apr. 26, 2016

(54) METHOD FOR DRIVING POWER SUPPLY SYSTEM

(75) Inventor: Koichiro Kamata, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 876 days.

(21) Appl. No.: 13/366,995

(22) Filed: Feb. 6, 2012

(65) Prior Publication Data

US 2012/0223592 A1 Sep. 6, 2012

(30) Foreign Application Priority Data

Mar. 4, 2011 (JP) ................................. 2011-047374

(51) Int. Cl.
 *H01F 27/42* (2006.01)
 *H02J 17/00* (2006.01)
 *H02J 5/00* (2006.01)

(52) U.S. Cl.
 CPC ........... *H02J 17/00* (2013.01); *H02J 5/005* (2013.01)

(58) Field of Classification Search
 CPC ............ H02J 17/00; B60L 11/18; B60L 5/00; B60M 7/00
 USPC ........................................................ 307/104
 See application file for complete search history.

(56) References Cited

U.S. PATENT DOCUMENTS

| 5,124,699 A | 6/1992 | Tervoert et al. |
| 5,428,521 A | 6/1995 | Kigawa et al. |
| 5,652,423 A | 7/1997 | Saitoh et al. |
| 5,790,946 A | 8/1998 | Rotzoll |
| 6,509,217 B1 | 1/2003 | Reddy |
| 6,737,302 B2 | 5/2004 | Arao |
| 6,837,438 B1 | 1/2005 | Takasugi et al. |
| 7,180,421 B2 | 2/2007 | Pahlaven et al. |
| 7,209,771 B2 | 4/2007 | Twitchell, Jr. |
| 7,301,830 B2 | 11/2007 | Takahashi et al. |
| 7,394,382 B2 | 7/2008 | Nitzan et al. |
| 7,675,358 B2 | 3/2010 | Atsumi |
| 7,907,902 B2 | 3/2011 | Kato et al. |
| 8,008,888 B2 | 8/2011 | Oyobe et al. |
| 8,129,864 B2 | 3/2012 | Baarman et al. |
| 8,217,535 B2 * | 7/2012 | Uchida et al. ................. 307/104 |
| 9,024,575 B2 | 5/2015 | Oyobe et al. |

(Continued)

FOREIGN PATENT DOCUMENTS

| EP | 2196351 A | 6/2010 |
| EP | 2415627 A | 2/2012 |

(Continued)

OTHER PUBLICATIONS

Kurs et al., "Wireless Power Transfer via Strongly Coupled Magnetic Resonances", Science, Jul. 6, 2007, vol. 317, No. 5834, pp. 83-86.

*Primary Examiner* — Jared Fureman
*Assistant Examiner* — Duc M Pham
(74) *Attorney, Agent, or Firm* — Nixon Peabody LLP; Jeffrey L. Costellia

(57) ABSTRACT

The frequency of high-frequency voltage which is output by a variable high frequency power source included in a power transmitting device is controlled in accordance with the value of electric power received by a power receiving device. That is to say, the frequency of the high-frequency voltage is controlled in accordance with data directly relating to power supply. Thus, electric power is accurately supplied with high transmission efficiency in the power supply system.

24 Claims, 3 Drawing Sheets

(56) References Cited

U.S. PATENT DOCUMENTS

| | | |
|---|---|---|
| 9,180,779 B2 | 11/2015 | Oyobe et al. |
| 2002/0049714 A1 | 4/2002 | Yamazaki et al. |
| 2003/0017804 A1 | 1/2003 | Heinrich et al. |
| 2003/0104848 A1 | 6/2003 | Brideglall |
| 2004/0077383 A1 | 4/2004 | Lappetelainen et al. |
| 2004/0128246 A1 | 7/2004 | Takayama et al. |
| 2004/0131897 A1 | 7/2004 | Jenson et al. |
| 2004/0145454 A1 | 7/2004 | Powell et al. |
| 2005/0020321 A1 | 1/2005 | Rotzoll |
| 2005/0215119 A1 | 9/2005 | Kaneko |
| 2005/0254183 A1 | 11/2005 | Ishida et al. |
| 2006/0009251 A1 | 1/2006 | Noda et al. |
| 2007/0216348 A1 | 9/2007 | Shionoiri et al. |
| 2007/0229228 A1 | 10/2007 | Yamazaki et al. |
| 2007/0229271 A1 | 10/2007 | Shionoiri et al. |
| 2007/0229279 A1 | 10/2007 | Yamazaki et al. |
| 2007/0229281 A1 | 10/2007 | Shionoiri et al. |
| 2007/0278998 A1 | 12/2007 | Koyama |
| 2007/0285246 A1 | 12/2007 | Koyama |
| 2010/0052431 A1* | 3/2010 | Mita ............................. 307/104 |
| 2010/0244577 A1* | 9/2010 | Shimokawa .................. 307/104 |
| 2010/0244839 A1 | 9/2010 | Yoshikawa |
| 2010/0259109 A1 | 10/2010 | Sato |
| 2010/0289449 A1 | 11/2010 | Elo |
| 2011/0049995 A1 | 3/2011 | Hashiguchi |
| 2011/0080053 A1 | 4/2011 | Urano |
| 2011/0095619 A1 | 4/2011 | Urano |
| 2011/0101791 A1 | 5/2011 | Urano |
| 2011/0169337 A1 | 7/2011 | Kozakai |
| 2011/0231029 A1* | 9/2011 | Ichikawa et al. ............. 700/298 |
| 2011/0241440 A1* | 10/2011 | Sakoda et al. ................ 307/104 |
| 2011/0248572 A1 | 10/2011 | Kozakai et al. |
| 2011/0270462 A1 | 11/2011 | Amano et al. |
| 2012/0032521 A1* | 2/2012 | Inoue et al. ................... 307/104 |
| 2012/0119588 A1 | 5/2012 | Baarman et al. |
| 2015/0210170 A1 | 7/2015 | Oyobe et al. |
| 2015/0251546 A1 | 9/2015 | Oyobe et al. |

FOREIGN PATENT DOCUMENTS

| | | |
|---|---|---|
| JP | 06-006272 | 1/1994 |
| JP | 10-285087 | 10/1998 |
| JP | 11-088243 | 3/1999 |
| JP | 2002-259921 | 9/2002 |
| JP | 2003-085506 | 3/2003 |
| JP | 2005-063123 | 3/2005 |
| JP | 2006-180073 | 7/2006 |
| JP | 2007-183790 | 7/2007 |
| JP | 2009-106136 A | 5/2009 |
| JP | 2010-068657 | 3/2010 |
| JP | 2010-119246 | 5/2010 |
| JP | 2010-193598 | 9/2010 |
| JP | 2010-239690 | 10/2010 |
| JP | 2010-252446 | 11/2010 |
| JP | 2010-252468 | 11/2010 |
| JP | 2010-252497 | 11/2010 |
| JP | 2010-252497 A | 11/2010 |
| JP | 2010-268665 | 11/2010 |
| JP | 2010-284006 | 12/2010 |
| JP | 2010-284066 | 12/2010 |
| JP | 2011-120410 | 6/2011 |
| JP | 2011-121456 | 6/2011 |
| JP | 2011-125184 | 6/2011 |
| JP | 2011-130614 | 6/2011 |
| JP | 2011-135717 | 7/2011 |
| JP | 2011-142769 | 7/2011 |
| WO | WO-2009/089253 | 7/2009 |
| WO | WO 2010-055381 A1 | 5/2010 |

* cited by examiner

METHOD FOR DRIVING POWER SUPPLY SYSTEM

BACKGROUND OF THE INVENTION

1. Field of the Invention

The present invention relates to a method for driving a power supply system. In particular, the present invention relates to a method for driving a power supply system to which electric power is supplied by a magnetic resonance method.

2. Description of the Related Art

A method called a magnetic resonance method attracts attention as a method for supplying electric power to an object (hereinafter, also referred to as a power receiving device) in a state where contact with a power supply source (hereinafter, also referred to as a power transmitting device) is not made (such a method is also referred to as contactless power supply, wireless power supply, or the like). The magnetic resonance method is a method for forming an energy propagation path by making resonance coils provided in a power transmitting device and a power receiving device magnetically resonate with each other. The magnetic resonance method has a longer power transmittable distance than other methods (e.g., an electromagnetic induction method and an electric field induction method). For example, Non Patent Document 1 discloses that in the magnetic resonance method, transmission efficiency is approximately 90% when the distance between a pair of resonance coils is 1 m and that the transmission efficiency is approximately 45% when the distance between the pair of resonance coils is 2 m.

Note that short distance between the pair of resonance coils does not mean high transmission efficiency in the magnetic resonance method. Further, the transmission efficiency is changed by various factors such as the self resonant frequency of the resonance coil and the frequency of high-frequency voltage induced by the resonance coil. Therefore, when electric power is supplied by the magnetic resonance method, these factors are preferably optimized. For example, Patent Document 1 discloses a method for driving a power supply system in which the frequency of high-frequency voltage output from a high frequency power source is changed in accordance with an estimated distance between a pair of resonance coils.

REFERENCE

[Patent Document 1] Japanese Published Patent Application No. 2010-252446
[Non Patent Document 1] Andre Kurs et al., "Wireless Power Transfer via Strongly Coupled Magnetic Resonances", *Science*, Vol. 317, pp. 83-86, 2007.

SUMMARY OF THE INVENTION

In the method for driving a power supply system disclosed in Patent Document 1, the distance between a pair of resonance coils is estimated on the basis of a S11 parameter. The S11 parameter indicates a reflected component of electromagnetic wave emitted by a resonance coil included in a power transmitting device. The S11 parameter is changed in accordance with a distance between the resonance coil included in the power transmitting device and a resonance coil included in a power receiving device. Note that the S11 parameter is changed in accordance with, not only the distance but also other factors (e.g., an obstacle to electromagnetic wave propagation). Accordingly, it might be difficult to perform appropriate supply of electric power by the method for driving a power supply system disclosed in Patent Document 1.

In view of the above problems, it is an object of one embodiment of the present invention to provide a method for driving a power supply system by which electric power is appropriately supplied.

An object of one embodiment of the present invention is to control the frequency of high-frequency voltage, which is output from a variable high frequency power source included in the power transmitting device, in accordance with the value of electric power received by the power receiving device.

Specifically, one embodiment of the present invention is a method for driving a power supply system that supplies high-frequency voltage output by a variable high frequency power source included in a power transmitting device to a power receiving device by a magnetic resonance method. The method includes a first step in which the power transmitting device detects a first value of electric power received by the power receiving device in a state where the variable high frequency power source outputs high-frequency voltage with a first frequency; a second step in which the power transmitting device detects a second value of electric power received by the power receiving device in a state where the variable high frequency power source outputs high-frequency voltage with a second frequency higher than the first frequency; and a third step in which after the first step and the second step, a frequency of the high-frequency voltage to be output by the variable high frequency power source is set to the first frequency when the first value of the electric power is larger than or equal to the second value of the electric power, and a frequency of the high-frequency voltage to be output by the variable high frequency power source is set to the second frequency when the first value of the electric power is smaller than the second value of the electric power.

Another embodiment of the present invention is a method for driving a power supply system in which the method for driving the power supply system in which the second step is performed after the first step, is performed plural times. The operation is repeatedly performed until the first value of electric power becomes larger than or equal to the second value of electric power, so that the first frequency and the second frequency in the operation which is performed plural times are increased in a step-by-step manner; then, the first frequency at the time when the first value of electric power is larger than or equal to the second value of electric power in the operation is held for a certain period as a frequency of high-frequency voltage output by the variable high frequency power source.

Another embodiment of the present invention is a method for driving a power supply system in which the method for driving the power supply system in which the first step is performed after the second step, is performed plural times. The operation is repeatedly performed until the first value of electric power becomes smaller than the second value of electric power, so that the first frequency and the second frequency in the operation which is performed plural times are decreased in a step-by-step manner; then, the second frequency at the time when the first value of electric power is smaller than the second value of electric power in the operation is held for a certain period as a frequency of high frequency voltage output by the variable high frequency power source.

Another embodiment of the present invention is a method for driving a power supply system in which the method for driving the power supply system is performed plural times. A sensor is provided in the power supply system, and the certain period is terminated when the sensor detects a change of a power supply environment.

Another embodiment of the present invention is a method for driving a power supply system in which the method for driving the power supply system is performed plural times. The value of electric power in a frequency which is selected in the third step of the operation performed plural times is held until at least the third step of the operation performed next time, so that the first step and the second step are not performed in the operation performed subsequent times.

Another embodiment of the present invention is a method for driving a power supply system. Supply of electric power from the power transmitting, device to the power receiving device and transmission and reception of a signal between the power transmitting device and the power receiving device are performed through a resonance coil included in the power transmitting device and a resonance coil included in the power receiving device.

In a method for driving a power supply system in one embodiment of the present invention, the frequency of high-frequency voltage which is output by a variable high frequency power source included in a power transmitting device is controlled in accordance with the value of electric power received by a power receiving device. That is to say, the frequency of the high-frequency voltage is controller in accordance with data directly relating to power supply. Thus, electric power is accurately supplied with high transmission efficiency in the power supply system.

In a method for driving a power supply system in one embodiment of the present invention, the frequency of the high-frequency voltage is dynamically controlled in accordance with the value of electric power received by the power receiving device. Thus, even when a power supply condition is changed over time (e.g., the case where impedance is changed over time by charging of a battery included in the power receiving device), electric power is accurately and regularly supplied with high transmission efficiency in the power supply system.

In a method for driving a power supply system in one embodiment of the present invention, a system for transmitting and receiving signals and a system for supplying electric power are not separately provided. Data transmission and reception and supply of electric power are both performed through a resonance coil in the power transmitting device and a resonance coil in the power receiving device. Accordingly, the power transmitting device and the power receiving device can be downsized.

DETAILED DESCRIPTION OF THE INVENTION

Hereinafter, embodiments of the present invention will be described in detail with reference to the accompanying drawings. Note that the present invention is not limited to the following description, and it is easily understood by those skilled in the art that a variety of changes and modifications can be made without departing from the spirit and scope of the present invention. Therefore, the present invention should not be limited to the descriptions of the embodiment below.

First, a configuration example and an operation example of a power supply system according to one embodiment of the present invention will be described with reference to FIGS. 1A to 1C.

<Structure Example of Power Supply System>

Figure 1A:
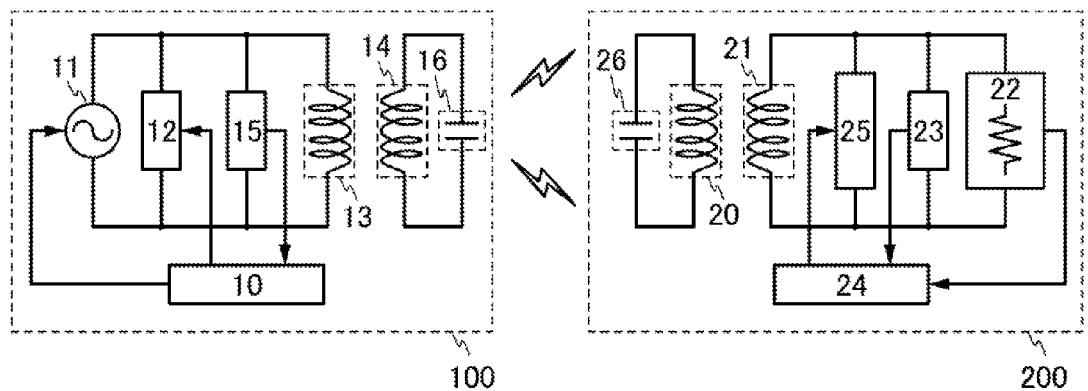
FIG. 1A illustrates a configuration example of a power supply system, and FIGS. 1B and 1C each illustrate a configuration example of a load.

FIG. 1A illustrates a configuration example of a power supply system. The power supply system illustrated in FIG. 1A includes a power transmitting device 100 and a power receiving device 200. Note that in the power supply system illustrated in FIG. 1A, electric power is supplied from the power transmitting device 100 to the power receiving device 200 by a magnetic resonance method.

The power transmitting device 100 includes a controller 10, a variable high frequency power source 11 for outputting high-frequency voltage with frequency controlled by the controller 10, a modulation circuit 12 for modulating the high-frequency voltage in accordance with signals generated by the controller 10, a coil 13 to which the high-frequency voltage modulated by the modulation circuit 12 is applied, a resonance coil 14 in which high-frequency voltage is induced by electromagnetic induction with the coil 13, and a demodulation circuit 15 for demodulating the signal from the high-frequency voltage induced by the coil 13. Further, in the resonance coil 14, stray capacitance 16 exists between wirings.

Note that the variable high frequency power source 11 may have any configuration as long as the frequency of high-frequency voltage output therefrom is controlled by the controller 10. Specifically, for the variable high frequency power source 11, a circuit in which analog voltage control is performed through a D/A converter can be used. For example, to the variable high frequency power source 11, a circuit in which a Colpitts oscillating circuit or a Hartley oscillating circuit is combined with a variable capacitance diode, a circuit in which a VCO (a voltage controlled oscillator) is combined with a PLL (a phase locked loop), or the like can be applied.

The configuration of the modulation circuit 12 may be any circuit as long as a signal can be superposed (e.g., amplitude modulation can be performed) with the use of high-frequency voltage as a carrier wave.

In FIG. 1A, the coil 13 and the resonance coil 14 are separately provided; however, these coils can be merged into a single coil. In that case, the series resistance and capacitance of the coil are increased. This indicates that a Q factor is decreased. Thus, as illustrated in FIG. 1A, it is preferable to provide the coil 13 and the resonance coil 14 separately.

The demodulation circuit 15 may be any circuit as long as it can identify a signal superposed on high-frequency voltage (e.g., a signal superposed on high-frequency voltage by amplitude modulation) and can output the signal as a digital signal.

Further, in the power transmitting device illustrated in FIG. 1A, only the stray capacitance 16 between the wirings exists in the resonance coil 14; however, a capacitor can be provided between the one end and the other end of the resonance coil 14.

The power receiving device 200 includes a resonance coil 20 in which high-frequency voltage is induced by magnetic resonance with the resonance coil 14 in the power transmitting device 100, a coil 21 in which high-frequency voltage is induced by electromagnetic induction with the resonance coil 20, a load 22 to which electric power is supplied in accordance with high-frequency voltage induced by the coil 21, a demodulation circuit 23 for demodulating the signal from the high-frequency voltage induced by the coil 21, a controller 24 for detecting the value of electric power supplied to the load 22 and obtaining the signal demodulated by the demodulation circuit 23, and a response unit 25 whose operation is controlled by the controller 24. Further, in the resonance coil 20, stray capacitance 26 exists between wirings.

In FIG. 1A, the resonance coil 20 and the coil 21 are separately provided; however, these coils can be merged into a single coil. In that case, the series resistance and capacitance of the coil are increased. This indicates that a Q factor is decreased. Thus, as illustrated in FIG. 1A, it is preferable to provide the resonance coil 20 and the coil 21 separately.

The load 22 can have any configuration as long as the value of electric power supplied thereto is detected by the controller 24. For example, the load 22 can include an AC-DC converter, a DC-DC converter, a battery, or the like. In particular, the load 22 preferably includes a battery on which charging is performed on the basis of high-frequency voltage induced in the coil 21. This is because in the case where magnetic resonance is utilized, electric power can be supplied with high efficiency even in a middle and long distance.

Figure 1B:
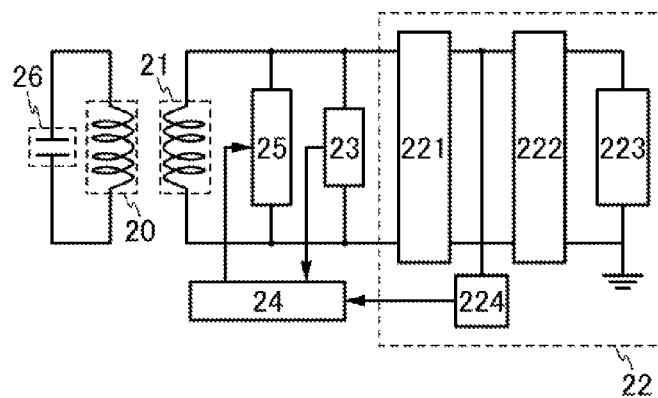

FIG. 1B illustrates a specific example of the load 22. The load 22 illustrated in FIG. 1B includes a rectification circuit 221 for rectifying the high-frequency voltage induced by the coil 21, a DC-DC converter 222 for converting a voltage rectified by the rectification circuit 221, a battery 223 charged by direct current voltage output from the DC-DC converter 222, and an A/D converter 224 for converting voltage and current rectified by the rectification circuit 221 into numbers and outputting it to the controller 24. In the power receiving device including the load 22 illustrated in FIG. 1B, the controller 24 can detect the value of electric power by a product of the voltage and the current rectified by the rectification circuit 221.

Figure 1C:
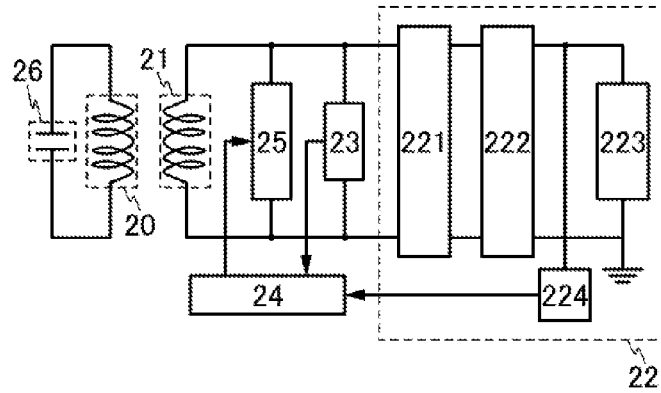

In addition, as illustrated in FIG. 1C, the A/D converter 224 may convert voltage and current output from the DC-DC converter 222 into numbers and can output it to the controller 24.

The demodulation circuit 23 may be any circuit as long as it can identify a signal superposed on high-frequency voltage (e.g., a signal superposed on high-frequency voltage by amplitude modulation) and can output the signal as a digital signal.

The configuration of the response unit 25 may be any configuration as long as it can respond to the external power transmitting device. For example, a resistor and a switch which are provided between the one end and the other end of the coil 21 and are connected in series can be used as the response unit 25. In that case, the response unit 25 can respond to the external power transmitting device by control of switching of the switch with the controller 24. As the switch, it is preferable to use a mechanical switch (e.g., a mechanical relay or a MEMS switch) for controlling whether a contact exists. This is because the high-frequency voltage might be applied to the switch.

Further, in FIG. 1A, only the stray capacitance 26 between the wirings exists in the resonance coil 20; however, a capacitor can be provided between the one end and the other end of the resonance coil 20.

<Operation Example of Power Supply System>

Figure 2:
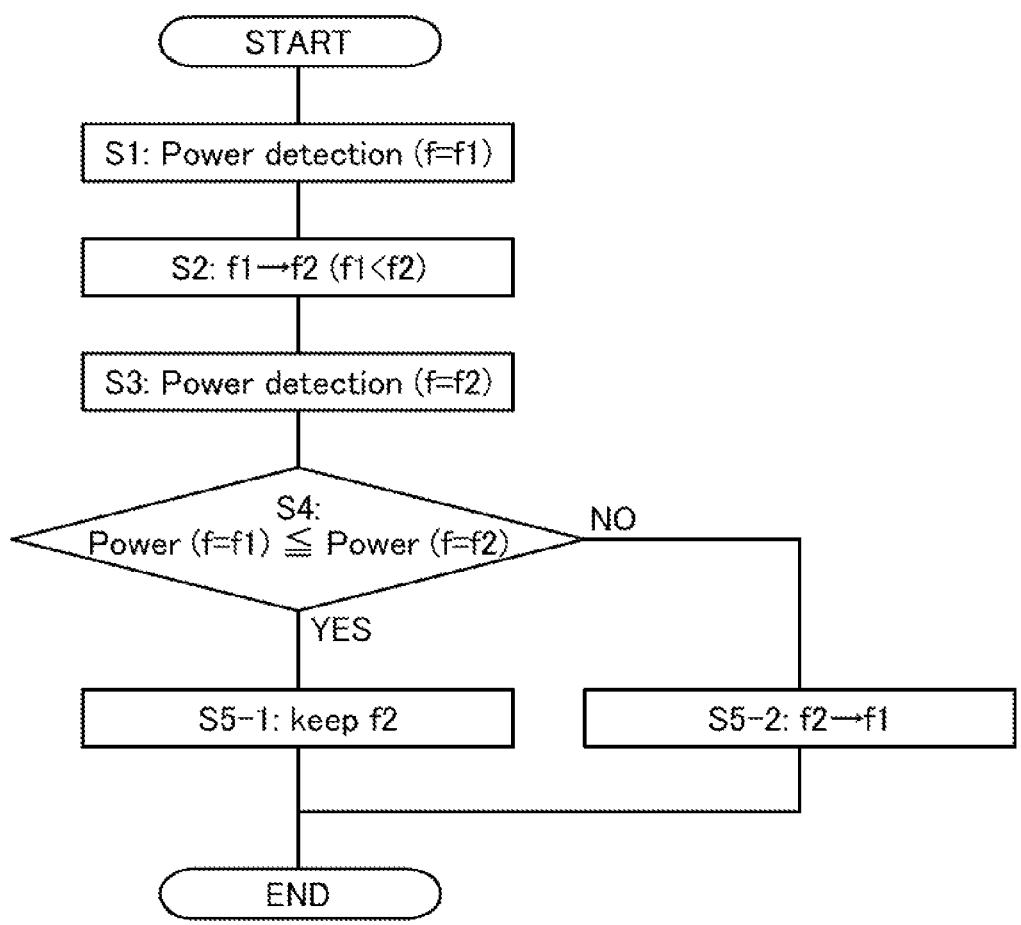
FIG. 2 is a flowchart of an operation example of a power supply system.

FIG. 2 is a flowchart illustrating an operation example of the power supply system in FIGS. 1A to 1C.

<Step 1 (S1)>

First, the value of electric power which the load 22 receives is detected while electric power is supplied to the load 22 with a predetermined frequency f1 by the variable high frequency power source 11. For example, the modulation circuit 12 performs load modulation on high-frequency voltage so that the power transmitting device 100 transmits a command signal for detecting the value of electric power received by the load 22. In accordance with the command signal demodulated by the demodulation circuit 23, the controller 24 detects the value of electric power received by the load 22 and replies the value of the electric power to the power transmitting device with the use of the response unit 25. The value of the electric power is temporarily stored in the controller 10. Note that the frequency f1 indicates a frequency at which the value of electric power is detected in <Step 1> and does not means the particular frequency.

<Step 2 (S2)>

Next, the controller 10 changes a frequency of the high-frequency voltage output by the variable high frequency power source 11 from the frequency f1 to a frequency f2 (here, the frequency f1<the frequency f2).

<Step 3 (S3)>

Then, the value of electric power received by the load 22 is detected while electric power is supplied to the load 22 with the frequency 12 by the variable high frequency power source 11. Specifically, an operation similar to the operation in <Step 1> is performed. Note that the frequency f2 indicates a frequency at which the value of electric power is detected in <Step 3> and does not means the particular frequency.

<Steps 4 (S4), 5-1 (S5-1), and 5-2 (S5-2)>

Next, in the controller 10, the value of electric power obtained in <Step 1> is compared with the value of electric power obtained in <Step 3>. When the latter is higher than or equal to the former, the controller 10 keeps the frequency f2 of the high-frequency voltage output by the variable high frequency power source 11. When the latter is lower than the former, the controller 10 changes the frequency of high-frequency voltage output by the variable high frequency power source 11 from the frequency f2 to the frequency f1. According to the above, the frequency f2 is selected when the former is equal to the latter. In this case, however, the frequency f1 can be selected. In other words, the following configuration can also be used: the frequency f2 of the high-frequency voltage output by the variable high frequency power source 11 is kept when the latter is higher than the former; on the other hand, the frequency of high-frequency voltage output by the variable high frequency power source 11 is changed from the frequency f2 to the frequency 11 when the latter is lower than or equal to the former.

By such an operation, the frequency of the high-frequency voltage output by the variable high frequency power source can be controlled so that the transmission efficiency of the power supply system is high.

Further, the operation shown in FIG. 2 can be repeated every predetermined period (regularly). By the operation, even when a power supply condition is changed over time, electric power is accurately and regularly supplied with high transmission efficiency in the power supply system.

Furthermore, the operation shown in FIG. 2 can also be repeated randomly (irregularly). For example, the operation shown in FIG. 2 is repeated plural times, and the frequency can be kept for a certain period from the time at which the frequency has an optimal value. Specifically, when the frequency of the high-frequency voltage output by the variable high frequency power source 11 has an approximately optimal value, it is assumed that increase and decrease in the frequency are repeated by repeat of the operation shown in FIG. 2. Accordingly, when the operation shown in FIG. 2 is repeated plural times, it is assumed that the frequency is increased to a certain number of times and then increase and decrease in the frequency is repeated. Therefore, the operation shown in FIG. 2 is repeated plural times, and the frequency at the time of being decreased from <Step 3> as a result of <Step 4> can be regarded as the optimal frequency. Note that a certain period for keeping the frequency can be predetermined time. Further, a sensor (e.g., a positional sensor) and the like can be provided for the power supply system so that the above operation restarts (the certain period is terminated) when change of a power supply environment (e.g., the case where the frequency of high-frequency voltage appropriate for power supply is changed by change in positional relation of the power transmitting device and the power receiving device) is detected by the sensor.

Note that in the case of performing the above operation plural times, <Step 1> is not necessarily performed in the operation performed at the second time or more. This is because if the value of electric power detected at the former time is stored, detection of the value of electric power (<Step 1>) is not needed. Specifically, in the operation shown in FIG. 2, the value of electric power detected in <Step 3> is stored in the case of proceeding to <Step 5-1> and the value of electric power detected in <Step 1> is stored in the case of proceeding to <Step 5-2>.

Further, a frequency is increased in <Step 2> (f1<f2) in the operation example shown in FIG. 2. However, the configuration in which a frequency is decreased in <Step 2> (f1>f2) can be used. In this case, the operation shown in FIG. 2 is repeated plural times, and the frequency at the time of being increased from <Step 3> as a result of <Step 4> can be regarded as the optimal frequency.

Further, in the power supply system, a mechanism for transmitting and receiving signals and a mechanism for supplying electric power are not separately provided, but signal transmission and reception and power supply are both performed through the resonance coils 14 and 20 and the coils 13 and 21. Thus, the power transmitting device and the power receiving device can be downsized.

Example

In this example, applications of the above power supply system are described. Note that as applications of a power supply system according to one embodiment of the present invention, portable electronic devices such as a digital video camera, a portable information terminal (e.g., a mobile computer, a cellular phone, a portable game machine, or an e-book reader), and an image reproducing device including a recording medium (specifically a digital versatile disc (DVD) reproducing device) can be given. In addition, an electric propulsion vehicle that is powered by electric power, such as an electric car, can be given. Examples of such electronic devices are described below with reference to FIGS. 3A and 3B.

Figure 3A:
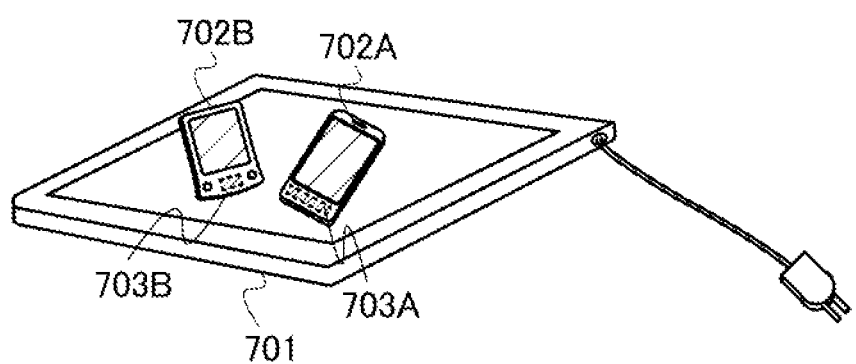
FIGS. 3A and 3B each illustrate an application example of a power supply system.

FIG. 3A illustrates an application of a power supply system to a cellular phone and a portable information terminal in which a power transmitting device 701, a cellular phone 702A including a power receiving device 703A, and a cellular phone 702B including a power receiving device 703B are included. The above power supply system can be provided for the power transmitting device 701 and the power receiving devices 703A and 703B.

Figure 3B:
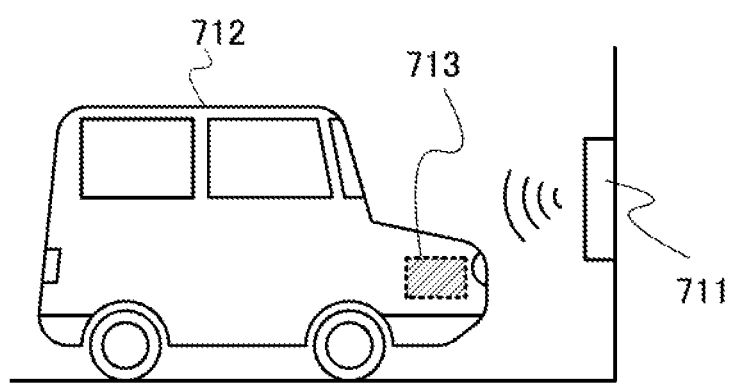

FIG. 3B illustrates an application of a power supply system to an electric car that is an electric propulsion moving vehicle in which a power transmitting device 711 and an electric car 712 including a power receiving device 713 are included. The above power supply system can be provided for the power transmitting device 711 and the power receiving device 713.

This application is based on Japanese Patent Application serial no. 2011-047374 filed with Japan Patent Office on Mar. 4, 2011, the entire contents of which are hereby incorporated by reference.

What is claimed is:

1. A method for driving a power supply system comprising:
   detecting a first value of electric power received by a power receiving device in a state where a power source in a power transmitting device outputs a high-frequency voltage with a first frequency, the first value of electric power being received by a magnetic resonance method;
   detecting a second value of electric power received by the power receiving device in a state where the power source outputs the high-frequency voltage with a second frequency higher than the first frequency, the second value of electric power being received by the magnetic resonance method; and
   setting a frequency of the high-frequency voltage to be output by the power source to the first frequency when the first value of electric power is larger than or equal to the second value of electric power, and to the second frequency when the first value of electric power is smaller than the second value of electric power,
   wherein detecting the second value of electric power is performed after detecting the first value of electric power is performed,
   wherein detecting the first value of electric power, detecting the second value of electric power, and setting the frequency of the high-frequency voltage to be output by the power source are repeatedly performed with the frequency of the high-frequency voltage to be output by the power source being the first frequency, until the first value of electric power becomes larger than or equal to the second value of electric power, so that the first frequency and the second frequency are increased in a step-by-step manner, and
   wherein the first frequency at the time when the first value of electric power is larger than or equal to the second value of electric power is held for a certain period as an optimal frequency.

2. The method for driving the power supply system according to claim 1,
   wherein a sensor is provided in the power supply system, and
   wherein the certain period is terminated when the sensor detects a change of a power supply environment.

3. The method for driving the power supply system according to claim 1,
   wherein a value of electric power in a temporal frequency which is set in setting the frequency of the high-frequency voltage to be output by the power source step performed plural times is held until at least setting the frequency of the high-frequency voltage to be output by the power source step performed next time, so that detecting the first value of electric power is not performed in subsequent times.

4. The method for driving the power supply system according to claim 1,
   wherein detecting the first value of electric power is performed in the power transmitting device.

5. The method for driving the power supply system according to claim 1,
   wherein detecting the second value of electric power is performed in the power transmitting device.

6. The method for driving the power supply system according to claim 1, wherein supply of electric power from the power transmitting device to the power receiving device and transmission and reception of a signal between the power transmitting device and the power receiving device are performed through a resonance coil included in the power transmitting device and a resonance coil included in the power receiving device.

7. A method for driving a power supply system comprising:
   detecting a first value of electric power received by a power receiving device in a state where a power source in a power transmitting device outputs a high-frequency voltage with a first frequency, the first value of electric power being received by a magnetic resonance method;
   detecting a second value of electric power received by the power receiving device in a state where the power source outputs the high-frequency voltage with a second frequency higher than the first frequency, the second value of electric power being received by the magnetic resonance method; and
   setting a frequency of the high-frequency voltage to be output by the power source to the first frequency when the first value of electric power is larger than or equal to the second value of electric power, and to the second frequency when the first value of electric power is smaller than the second value of electric power,
   wherein detecting the first value of electric power is performed after detecting the second value of electric power is performed,
   wherein detecting the first value of electric power, detecting the second value of electric power, and setting the frequency of the high-frequency voltage to be output by the power source are repeatedly performed with the frequency of the high-frequency voltage to be output by the power source being the second frequency, until the first value of electric power becomes smaller than the second value of electric power, so that the first frequency and the second frequency are decreased in a step-by-step manner, and
   wherein the second frequency at the time when the first value of electric power is smaller than the second value of electric power is held for a certain period as an optimal frequency.

8. The method for driving the power supply system according to claim 7,
   wherein a sensor is provided in the power supply system, and
   wherein the certain period is terminated when the sensor detects a change of a power supply environment.

9. The method for driving the power supply system according to claim 7,
   wherein a value of electric power in a temporal frequency which is set in setting the frequency of the high-frequency voltage to be output by the power source step performed plural times is held until at least setting the frequency of the high-frequency voltage to be output by the power source step performed next time, so that detecting the second value of electric power is not performed in subsequent times.

10. The method for driving the power supply system according to claim 7,
    wherein detecting the first value of electric power is performed in the power transmitting device.

11. The method for driving the power supply system according to claim 7,
    wherein detecting the second value of electric power is performed in the power transmitting device.

12. The method for driving the power supply system according to claim 7,
    wherein supply of electric power from the power transmitting device to the power receiving device and transmission and reception of a signal between the power transmitting device and the power receiving device are performed through a resonance coil included in the power transmitting device and a resonance coil included in the power receiving device.

13. A method for driving a power supply system comprising:
    detecting a first value of electric power received by a power receiving device in a state where a power source in a power transmitting device outputs a high-frequency voltage with a first frequency, the first value of electric power being received by a magnetic resonance method;
    detecting a second value of electric power received by the power receiving device in a state where the power source outputs the high-frequency voltage with a second frequency higher than the first frequency, the second value of electric power being received by the magnetic resonance method; and
    setting a frequency of the high-frequency voltage to be output by the power source to the first frequency when the first value of electric power is larger than the second value of electric power, and to the second frequency when the first value of electric power is smaller than or equal to the second value of electric power,
    wherein detecting the second value of electric power is performed after detecting the first value of electric power is performed,
    wherein detecting the first value of electric power, detecting the second value of electric power, and setting the frequency of the high-frequency voltage to be output by the power source are repeatedly performed with the frequency of the high-frequency voltage to be output by the power source being the first frequency, until the first value of electric power becomes larger than the second value of electric power, so that the first frequency and the second frequency are increased in a step-by-step manner, and
    wherein the first frequency at the time when the first value of electric power is larger than the second value of electric power is held for a certain period as an optimal frequency.

14. The method for driving the power supply system according to claim 13,
    wherein a sensor is provided in the power supply system, and
    wherein the certain period is terminated when the sensor detects a change of a power supply environment.

15. The method for driving the power supply system according to claim 13,
    wherein a value of electric power in a temporal frequency which is set in setting the frequency of the high-frequency voltage to be output by the power source step performed plural times is held until at least setting the frequency of the high-frequency voltage to be output by the power source step performed next time, so that detecting the first value of electric power is not performed in subsequent times.

16. The method for driving the power supply system according to claim 13,
    wherein detecting the first value of electric power is performed in the power transmitting device.

17. The method for driving the power supply system according to claim 13, wherein detecting the second value of electric power is performed in the power transmitting device.

18. The method for driving the power supply system according to claim 13,
wherein supply of electric power from the power transmitting device to the power receiving device and transmission and reception of a signal between the power transmitting device and the power receiving device are performed through a resonance coil included in the power transmitting device and a resonance coil included in the power receiving device.

19. A method for driving a power supply system comprising:
detecting a first value of electric power received by a power receiving device in a state where a power source in a power transmitting device outputs a high-frequency voltage with a first frequency, the first value of electric power being received by a magnetic resonance method;
detecting a second value of electric power received by the power receiving device in a state where the power source outputs the high-frequency voltage with a second frequency higher than the first frequency, the second value of electric power being received by the magnetic resonance method; and
setting a frequency of the high-frequency voltage to be output by the power source to the first frequency when the first value of electric power is larger than the second value of electric power, and to the second frequency when the first value of electric power is smaller than or equal to the second value of electric power,
wherein detecting the first value of electric power is performed after detecting the second value of electric power is performed,
wherein detecting first value of electric power, detecting the second value of electric power, and setting the frequency of the high-frequency voltage to be output by the power source are repeatedly performed with the frequency of the high-frequency voltage to be output by the power source being the second frequency, until the first value of electric power becomes smaller than or equal to the second value of electric power, so that the first frequency and the second frequency are decreased in a step-by-step manner, and
wherein the second frequency at the time when the first value of electric power is smaller than or equal to the second value of electric power is held for a certain period as an optimal frequency.

20. The method for driving the power supply system according to claim 19,
wherein a sensor is provided in the power supply system, and
wherein the certain period is terminated when the sensor detects a change of a power supply environment.

21. The method for driving the power supply system according to claim 19,
wherein a value of electric power in a temporal frequency which is set in setting the frequency of the high-frequency voltage to be output by the power source step performed plural times is held until at least setting the frequency of the high-frequency voltage to be output by the power source step performed next time, so that detecting the second value of electric power is not performed in subsequent times.

22. The method for driving the power supply system according to claim 19,
wherein detecting the first value of electric power is performed in the power transmitting device.

23. The method for driving the power supply system according to claim 19,
wherein detecting the second value of electric power is performed in the power transmitting device.

24. The method for driving the power supply system according to claim 19,
wherein supply of electric power from the power transmitting device to the power receiving device and transmission and reception of a signal between the power transmitting device and the power receiving device are performed through a resonance coil included in the power transmitting device and a resonance coil included in the power receiving device.

* * * * *